US008013297B2

(12) United States Patent
Peng et al.

(10) Patent No.: US 8,013,297 B2
(45) Date of Patent: Sep. 6, 2011

(54) ION GATE FOR DUAL ION MOBILITY SPECTROMETER AND METHOD THEREOF

(75) Inventors: Hua Peng, Beijing (CN); Qingjun Zhang, Beijing (CN); Jin Lin, Beijing (CN); Yuanjing Li, Beijing (CN); Zhiqiang Chen, Beijing (CN); Shaoji Mao, Beijing (CN); Zhude Dai, Beijing (CN); Dai Hua, legal representative, Beijing (CN); Shiping Cao, Beijing (CN); Zhongxia Zhang, Beijing (CN); Yangtian Zhang, Beijing (CN); Dexu Lin, Beijing (CN); Qinghua Wang, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 132 days.

(21) Appl. No.: 12/579,719

(22) Filed: Oct. 15, 2009

(65) Prior Publication Data

US 2010/0102219 A1 Apr. 29, 2010

(30) Foreign Application Priority Data

Oct. 20, 2008 (CN) .......................... 2008 1 0119974

(51) Int. Cl.
*G01N 27/64* (2006.01)
*H01J 49/06* (2006.01)

(52) U.S. Cl. ........ 250/296; 250/282; 250/290; 250/292; 250/297

(58) Field of Classification Search .................. 250/281, 250/282, 290, 292, 296, 297
See application file for complete search history.

(56) References Cited

U.S. PATENT DOCUMENTS

| | | | | |
|---|---|---|---|---|
| 4,445,038 | A | 4/1984 | Spangler et al. | 250/382 |
| 6,837,657 | B2 * | 1/2005 | Li et al. | 410/65 |
| 7,259,369 | B2 | 8/2007 | Scott et al. | 250/287 |
| 7,684,541 | B2 * | 3/2010 | Wang et al. | 378/57 |
| 7,688,945 | B2 * | 3/2010 | Chen et al. | 378/62 |
| 7,807,964 | B2 * | 10/2010 | Li et al. | 250/287 |

* cited by examiner

*Primary Examiner* — David A Vanore
(74) *Attorney, Agent, or Firm* — Westman, Champlin & Kelly, P.A.

(57) ABSTRACT

Disclosed is an ion gate for a dual IMS and method. The ion gate includes an ion source, a first gate electrode placed on one side of the ion source, a second gate electrode placed on the other side of the ion source, a third gate electrode placed on the side of the first gate electrode away from the ion source, a fourth gate electrode placed on the side of the second gate electrode away from the ion source, wherein during the ion storage, the potential at the position on the tube axis of the ion gate corresponding to the first gate electrode is different from the potentials at the positions on the tube axis corresponding to the ion source and the third gate electrode, and the potential at the position on the tube axis corresponding to the second gate electrode is different from the potentials at the positions on the tube axis corresponding to the ion source and the fourth gate electrode. According to the present invention, after sample gas enters the ion gates, charge exchange with reaction ions occurs between the first gate electrode and the second electrode, and positive and negative ions are continuously stored into the storage regions for the positive and negative ions. This leads to an improvement of utility rate of ions. Then, the ions are educed in a step-wise manner from the storage regions for the positive and negative ions by a simple control of a combination of the electrodes.

11 Claims, 3 Drawing Sheets

ION GATE FOR DUAL ION MOBILITY SPECTROMETER AND METHOD THEREOF

The present application claims priority of Chinese patent application Serial No. 200810119974.6, filed Oct. 20, 2008, the content of which is hereby incorporated by reference in its entirety.

BACKGROUND OF THE INVENTION

1. Field of Invention

The present invention relates to a field of inspection on explosives, drug and the like, and in particular to an ion gate used in a dual ion mobility spectrometer (IMS) and the method thereof.

2. Description of Prior Art

Generally, a dual IMS is primarily formed of an ion source, two drift tubes (TOF), a positive and negative ion reaction zone, a positive ion gate, a negative ion gate and two detectors. The simplest formation is such that the two drift tubes are located on the two sides of the reaction zone, respectively. The dual IMS differs from a common IMS in that the structure of the ion gate imposes a significant effect on the sensitivity of the instrument due to the necessity of positive and negative ion detection. As shown in Patent Document 1 (U.S. Pat. No. 4,445,038), two electrodes arranged in the front of the drift tubes for positive and negative ions, respectively, forms the gates for positive and negative ions, and the ion source is located in the middle of the two electrodes. Sample gas is ionized after entering from a tube above the ion source, and stays within the gates for positive and negative ions at both sides of the ion source. After a pulse arrives, the positive and negative ions within the ion gates are released to the adjacent drift tubes, respectively. Patent Document 1 offers an advantage of a simple control of ions, while it has a disadvantage of complex manufacture process for the ion gate, strict requirements on assembly and high produce cost. Further, the effective utility rate of ions is low. The structure of the gates causes a loss of about 90% of the total ions inside the gates, leading to poor instrument sensitivity.

In order to improve the effective utility rate of ions, Patent Document 2 (U.S. Pat. No. 7,259,369 B2) provides a method of simultaneously storing positive and negative ions by use of a quad-polar ion trap and simultaneously releasing positive and negative ions under the control of electrodes. The quad-polar ion trap is composed of two oblate cylinders, an external cylinder with a larger inner radius and two smaller hat-shaped cylinders each having a hole in the center. The two oblate cylinders are assembled at both ends of the external cylinder, and the two smaller hat-shaped cylinders are assembled inside the two oblate cylinders, respectively, with their hat tops opposite to each other. The structure in Patent Document 2 eliminates the disadvantage in Patent Document 1, because the quad-polar ion trap has a function of focusing and compressing ions and thus improves the system resolution, while there are several gas entrance holes allowing change of carrier gas and migrant gas at any time. Unfortunately, both of the positive and negative ions are stored in the same area in the ion trap, and thus part of the ions is lost due to the charge exchange between the ions. Further, the quad-polar ion trap has a complex structure and thus a very stringent requirement for concentricity and assembly, leading to a higher fabrication cost. Also, the scheme of electrode control is relatively complicated, which makes control over the whole apparatus more difficult.

Another patent document provides a method of measuring positive and negative ions separately within a single drift tube under electrode control. This solution is advantageous in terms of a simple structure and small size of the apparatus, while the shortcoming is that it is impossible to measure both the positive and negative ions at the same time, and the change of carrier gas and migrant gas in the apparatus is restricted.

SUMMARY OF THE INVENTION

In view of the above problems in the prior art, the present invention provides a novel gate for positive and negative ions on the basis of the existing dual IMS, which can effectively reduce the loss of ions and substantially improve sensitivity for IMS detection. Meanwhile, the resolution of the dual IMS is increased through a simple, fast and sufficient ion eduction scheme. The production cost is significantly reduced due to simple electrode control method, ion gate structure and manufacture process.

According to an aspect of the present invention, an ion gate for a dual IMS is provided comprising an ion source, a first gate electrode placed on one side of the ion source, a second gate electrode placed on the other side of the ion source, a third gate electrode placed on the side of the first gate electrode away from the ion source, a fourth gate electrode placed on the side of the second gate electrode away from the ion source, wherein during the phase of ion storage, the potential at the position on the tube axis of the ion gate corresponding to the first gate electrode is different from the potentials at the positions on the tube axis corresponding to the ion source and the third gate electrode, and the potential at the position on the tube axis corresponding to the second gate electrode is different from the potentials at the positions on the tube axis corresponding to the ions.

Preferably, during the phase of ion storage, the potential at the position on the tube axis corresponding to the first gate electrode is higher than the potentials at the positions on the tube axis corresponding to the ion source and the third gate electrode, and the potential at the position on the tube axis corresponding to the second gate electrode is lower than the potentials at the positions on the tube axis corresponding to the ion source and the fourth gate electrode.

Preferably, the ion gate further comprises a fifth gate electrode placed on the side of the third gate electrode away from the ion source and a sixth gate electrode placed on the side of the fourth gate electrode.

Preferably, the fifth and sixth gate electrodes act as the initial parts of drift tubes for positive and negative ions, respectively.

Preferably, during the ion eduction, ions are educed by controlling the potential on the tube axis of at least one of the ion source, the first, second, third and fourth gate electrodes.

Preferably, the first, third and fifth gate electrodes are arranged, with respective to the ion source, in symmetry with the second, fourth and sixth gate electrodes.

Preferably, the first, third and fifth gate electrodes are arranged, with respective to the ion source, in dissymmetry with the second, fourth and sixth gate electrodes According a further aspect of the present invention, a method for an ion gate for a dual IMS is provided, the ion gate comprises an ion source, and the method comprises steps of setting the potential at a first position on the tube axis on one side of the ion source to be different from the potential of the ion source and the potential at a third position on the tube axis of the ion gate, which is adjacent to the first position in the direction away from the ion source, on the same side of the ion source, so as to form a first ion storage region; and setting the potential at a second position on the tube axis on the other side of the ion source to be different from the potential of the ion source and the potential at a fourth position on the tube axis, which is adjacent to the first position in the direction away from the ion source, on the same other side of the ion source, so as to form a second ion storage region.

Preferably, the potential at a first position on the tube axis on one side of the ion source is set to be higher than the potential of the ion source and the potential at a third position on the tube axis, which is adjacent to the first position in the direction away from the ion source, on the same side of the ion source, so as to form a first ion storage region, and the potential at a second position on the tube axis on the other side of the ion source is set to be lower than the potential of the ion source and the potential at a fourth position on the tube axis, which is adjacent to the first position in the direction away from the ion source, on the same other side of the ion source, so as to form a second ion storage region.

Preferably, the method further comprises a step of educing ions by controlling the potential on the tube axis.

Preferably, the step of educing ions by controlling the potential on the tube axis comprises applying a respective potential to one of the first, second, third and fourth positions to educe the ions.

With the ion gate and the method of the present invention, after sample gas enters the ion gates, charge exchange with reaction ions occurs between the first gate electrode and the second electrode, and positive and negative ions (sample ions, reaction ions) are continuously stored into the storage regions for the positive and negative ions. This leads to an improvement of utility rate of ions. Then, the ions are educed in a step-wise manner from the storage regions for the positive and negative ions by a simple control of a combination of the electrodes.

BRIEF DESCRIPTION OF THE DRAWINGS

The above advantages and features of the present invention will be apparent from the following detailed description taken conjunction with the drawings in which.

DETAILED DESCRIPTION OF THE PREFERRED EMBODIMENTS

Now, a detailed description will be given to the preferred embodiments of the present invention with reference to the figures, throughout which like reference signs denote identical or similar component, though illustrated in different figures. For clarity and conciseness, specific description of any known function or structure incorporated here will be omitted otherwise the subject of the present invention may be obscured.

First Embodiment

Figure 1:
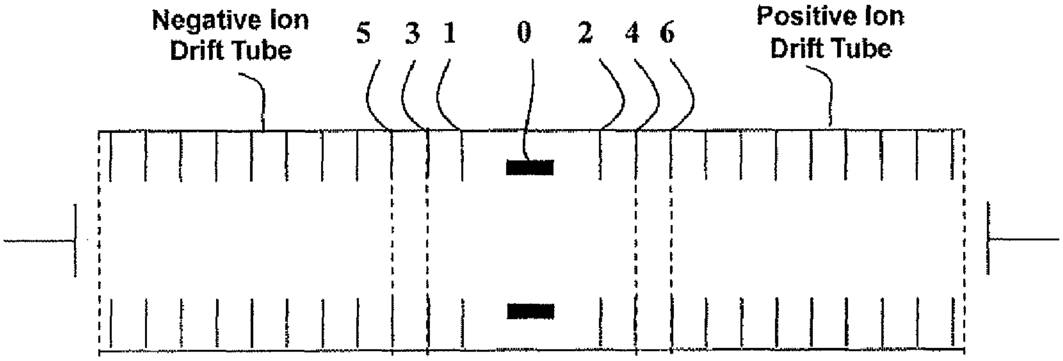
FIG. 1 is a schematic diagram of the sectional structure of an ion gate for a dual IMS according to an embodiment of the present invention.

FIG. 1 shows an ion gate for positive and negative ions used in a dual IMS. The ion gate is provided with an ion source 0, a first gate electrode 1, a second gate electrode 2, a third gate electrode 3 and a fourth gate electrode 4. The second gate electrode 2 is located between the ion source 0 and the fourth gate electrode 4, and the first gate electrode 1 is located between the ion source 0 and the third gate electrode 3. Further, a fifth gate electrode 5 can be the initial part of a drift tube for detecting negative ions, and a sixth gate electrode 6 can be the initial part of a drift tube for detecting positive ions. With respect to the ion source 0, the first, third and fifth gate electrodes 1, 3, 5 are arranged in symmetry with the second, fourth and sixth gate electrodes 2, 4, 6.

Figure 2A:
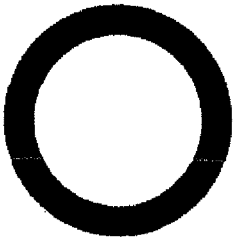
FIGS. 2A-2F are schematic diagrams of the detailed structure of each electrode shown in FIG. 1.
Figure 2B:
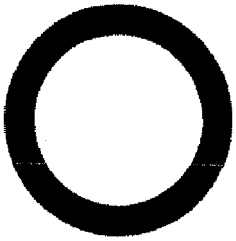
Figure 2C:
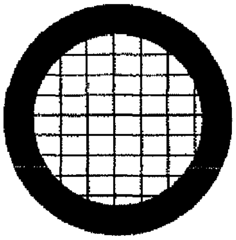
Figure 2D:
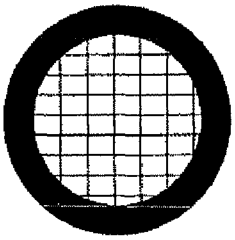
Figure 2E:
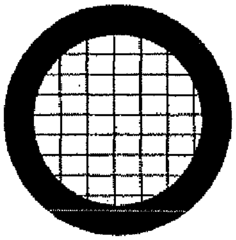
Figure 2F:
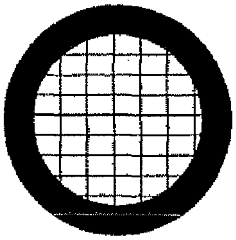

The ion source 0 serves to ionize sample molecules. The ion source can be a radioactive isotope, laser and the like. Each of the first and second gate electrodes 1, 2 is a plate having a hole at the center. They are formed as circular electrodes to protect ions stored nearby from being lost due to collision with any electrode, as shown in FIGS. 2A and 2B. Each of the third and fourth gate electrodes 3, 4 is a plate with a high ion transmittance (above 80%), which is made of conductive material and formed as a meshy electrode as shown in FIGS. 2C and 2D. Also, each of the fifth and sixth gate electrodes 5, 6 is a plate with a high ion transmittance (above 80%), which is made of conductive material and formed as a meshy electrode as shown in FIGS. 2E and 2F.

Alternatively, each of the third, fourth, fifth and sixth gate electrodes 3, 4, 5, 6 can be any of the known electrodes having other structures, for example, a plate having several holes.

Initially, the ion source 0, the fifth gate electrode 5 and the sixth gate electrode 6 are placed at a potential of 0, the first and fourth gate electrodes 1, 4 each have a potential higher than the ion source 0, and the second and third gate electrodes 2, 3 each have a potential lower than the ion source 0. Because the potential of the first gate electrode 1 is higher than the potentials of the ion source 0 and the third gate electrode 3, an ion storage region for storing negative ions is formed adjacent to the first gate electrode 1.

Figure 3:
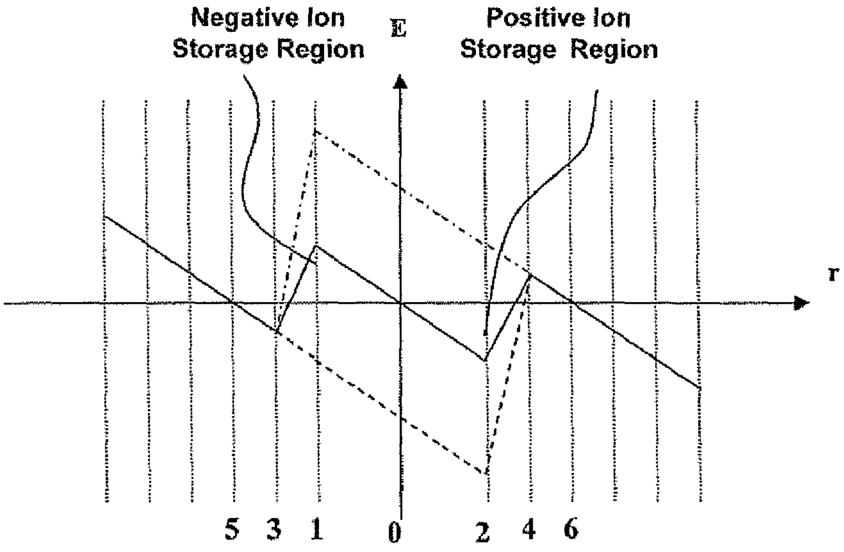
FIG. 3 is a schematic graph of the distribution of potentials along the tube axis during the ion storage and eduction according to the first embodiment of the present invention.

The potential of the second gate electrode 2 is lower than the potentials of the ion source 0 and the fourth gate electrode 4, and thus an ion storage region for storing positive ions is formed adjacent to the second gate electrode 2. Solid line in FIG. 3 depicts a curve of the distribution of electrical field strength at respective positions within the tube during the storage phase. The ion source 0 and the first and second gate electrodes 1, 2 can be formed together as a combined electrode.

After sample gas enters the system, charge exchange with reaction ions occurs between the first and second gate electrodes 1, 2. Driven by the electrical field between the first and second gate electrodes 1, 2, positive and negative ions within this region penetrate through the ion source 0 and then are stored into the negative ion storage region adjacent to the first gate electrode 1 and the positive ion storage region adjacent to the second gate electrode 2.

Figure 4:
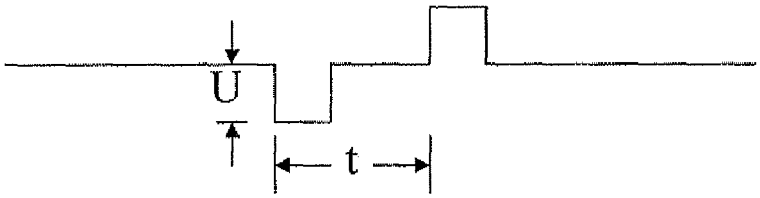
FIG. 4 is a schematic diagram showing electrode control pulses.

The instrument sensitivity is substantially improved by continuously filling the ion storage regions with ions during the period of instrument measurement. Then, a negative pulse having an amplitude U, as shown in FIG. 4, is applied to the combined electrode, whose potential is reduced concurrently by the magnitude U. Instantaneously, an electrical field for educing negative ions is established between the ion source 0 and the third gate electrode 3.

The potential of the first gate electrode 1 is lower than that of the third gate electrode 3 during the width period of the negative pulse, as denoted by the broken line in FIG. 3. As a result, negative ions stored nearby the first gate electrode 1 are driven by the eduction electrical field and enter the drift tube for detecting negative ions. Meanwhile, positive ions stored nearby the second gate electrode 2 are compressed by the electrical field.

After elapsing of a time interval t, the combined electrode is subjected to a positive pulse having an amplitude U, and instantaneously, an electrical field for educing positive ions is established between the ion source 0 and the fourth gate electrode 4.

The potential of the second gate electrode 2 is higher than that of the fourth gate electrode 4 during the width period of the positive pulse, as denoted by the dash-dotted line in FIG. 3. As a result, positive ions stored nearby the second gate electrode 2 are driven by the eduction electrical field and enter the drift tube for detecting positive ions. Also, negative ions stored nearby the first gate electrode 1 are compressed.

As required in practical applications, the time interval t, the widths of the positive and negative pulses are adjustable, and the combined electrode can be first subjected to a positive pulse and then to a negative pulse. Within a single pulse period, the time interval t from the beginning of a state to the beginning of another state fulfills the relationship of 500 ms≧t≧20 μs.

The above first embodiment illustrates the process of educing ions by the combined electrode comprising the ion source 0, the first and the second gate electrodes 1, 2, though the present invention is not limited to this embodiment. For example, the ions can be educed by controlling only the potential of the ion source 0, requiring a negative (positive) pulse having such a large jump amplitude that ions are enabled to penetrate through the electrode 1(2), and causing the potential at the position on the tube axis corresponding to the first (second) gate electrode 1(2) to be lower than that of the third (fourth) gate electrode 3(4). The tube axis is a center line of the drift tube.

Second Embodiment

Figure 5:
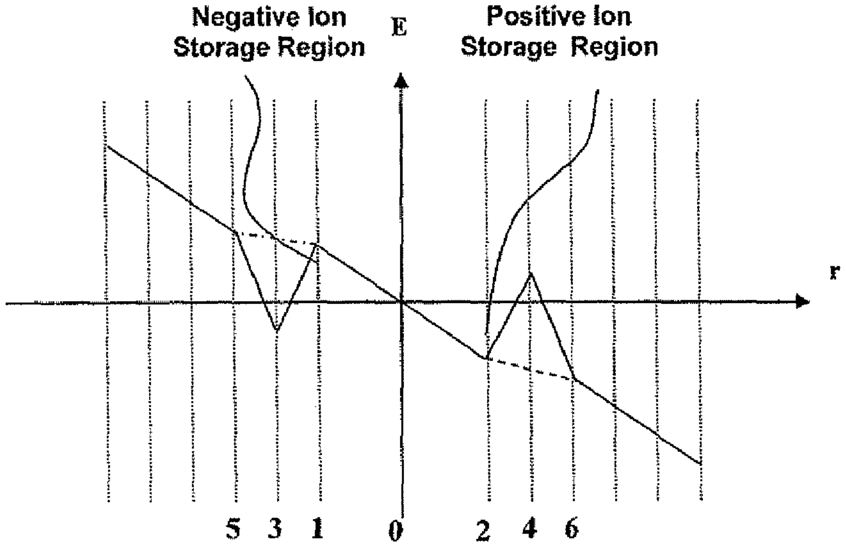
FIG. 5 is a schematic graph of the distribution of potentials along the tube axis during the ion storage and eduction according to the second embodiment of the present invention.

FIG. 5 is a schematic graph of the distribution of potentials along the tube axis during the ion storage and eduction according to the second embodiment of the present invention.

As shown in FIG. 5, according to the second embodiment of the present invention, the respective electrodes and the ion source are applied with voltages during the ion storage phase so that the potentials along the tube axis of the ion gate fulfill the relationship: the potential at the fifth gate electrode 5>the potential at the first gate electrode 1>the potential at the ion source 0>the potential at the third gate electrode 3, and accordingly a negative ion storage region for storing negative ions is formed adjacent to the first gate electrode 1; and the potential at the sixth gate electrode 6<the potential at the second gate electrode 2<the potential at the ion source 0<the potential at the fourth gate electrode 4, and accordingly a positive ion storage region for storing positive ions is formed adjacent to the second gate electrode 2.

During the phase of eduction of negative ion, a negative pulse is applied to the ion source 0 so that the potentials generated along the axial direction of the ion gate fulfill the relationship: the potential at the fifth gate electrode 5>the potential at the third gate electrode 3>the potential at the first gate electrode 1>the potential at the ion source 0, and accordingly only negative ions are educed.

During the phase of eduction of positive ion, a positive pulse is applied to the ion source 0 so that the potentials generated along the axial direction of the ion gate fulfill the relationship: the potential at the ion source 0>the potential at the second gate electrode 2>the potential at the fourth gate electrode 4>the potential at the sixth gate electrode 6, and accordingly only positive ions are educed.

In this case, ions can be educed by merely controlling the ion source 0, and thus the structure of control circuit (not shown) and the control process are simplified.

Alternatively, the ion eduction can be enabled by applying pulses to the third and fourth gate electrodes 3, 4, respectively.

As shown in FIG. 5, a positive pulse is applied to the third gate electrode 3 during the phase of negative ion eduction to make the potential at the third gate electrode 3 is greater than the first gate electrode 5 but lower than the fifth gate electrode 5, so that only negative ions are educed.

As shown in FIG. 5, a negative pulse is applied to the fourth gate electrode 4 during the phase of positive ion eduction to make the potential at the fourth gate electrode 4 is greater than the sixth gate electrode 6 but lower than the second gate electrode 2, so that only positive ions are educed.

In this case, the structure of control circuit and the control process used in the ion eduction are also simple, and efficiency of ion releasing is relatively high.

Alternatively, the ion eduction can be enabled by applying pulses to both of the gate electrodes of the positive and negative ion storage regions and the ion source 0, respectively.

During the phase of negative ion eduction, negative pulses are applied to the first gate electrodes 1 and the ion source 0 so that the potentials generated along the axial direction of the ion gate fulfill the relationship: the potential at the fifth gate electrode 5>the potential at the third gate electrode 3>the potential at the first gate electrode 1>the potential at the ion source 0, and accordingly only negative ions are educed.

During the phase of positive ion eduction, positive pulses are applied to the second gate electrode 2 and the ion source 0 so that the potentials generated along the axial direction of the ion gate fulfill the relationship: the potential at the ion source 0>the potential at the second gate electrode 2>the potential at the fourth gate electrode 4>the potential at the sixth gate electrode 6, and accordingly only positive ions are educed.

In this case, the structure of control circuit and the control process are also simple, and efficiency of ion releasing is relatively high.

Third Embodiment

Figure 6:
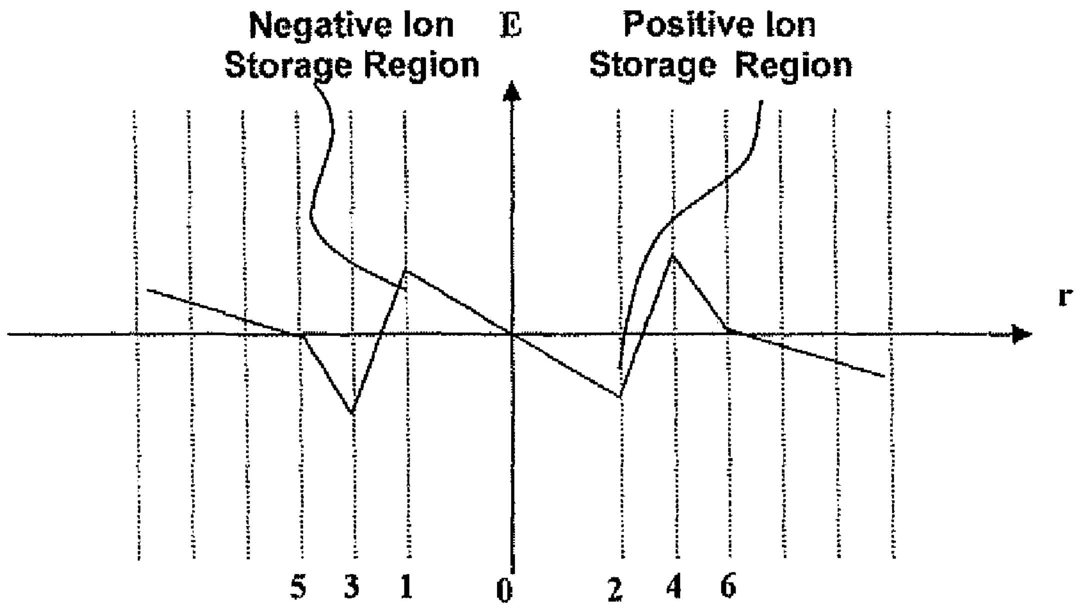
FIG. 6 is a schematic graph of the distribution of potentials along the tube axis during the ion storage and eduction according to the third embodiment of the present invention.

FIG. 6 is a schematic graph of the distribution of potentials along the tube axis during the ion storage and eduction according to the third embodiment of the present invention.

the respective electrodes and the ion source are applied with voltages during the ion storage phase so that the potentials along the tube axis of the ion gate fulfill the relationship: the potential at the first gate electrode 1>the potential at the fifth gate electrode 5=the potential at the ion source 0>the potential at the third gate electrode 3, and accordingly a negative ion storage region is formed adjacent to the first gate electrode 1; and the potential at the second gate electrode 2<the potential at the ion source 0=the potential at the sixth gate electrode 6<the potential at the fourth gate electrode 4, and accordingly a positive ion storage region is formed adjacent to the second gate electrode 2.

During the phase of negative ion eduction, the negative ions are educed by controlling only the potential at the ion source 0, requiring a negative pulse having a jump amplitude large enough to enable the ions to penetrate through the first gate electrode 1, and causing the potential at the position on the tube axis corresponding to the first gate electrode 1 to be lower than that the potential at the position on the tube axis corresponding to the third gate electrode 3.

During the phase of positive ion eduction, the positive ions are educed by controlling only the potential at the ion source 0, requiring a positive pulse having a jump amplitude large enough to enable the ions to penetrate through the second gate electrode 2, and causing the potential at the position on the tube axis corresponding to the second gate electrode 2 to be higher than that the potential at the position on the tube axis corresponding to the fourth gate electrode 4.

In this case, the structure of control circuit and the control process are simple, and efficiency of ion releasing is relatively high.

Alternatively, the ions can be educed by applying pulses to the first gate electrode 1, the ion source 0 and the second gate electrode 2 at the same time.

During the phase of negative ion eduction, negative pulses are applied to the first gate electrodes 1 and the ion source 0 so that the potentials generated along the axial direction of the ion gate fulfill the relationship; the potential at the fifth gate electrode 5>the potential at the third gate electrode 3>the potential at the first gate electrode 1>the potential at the ion source 0, and accordingly negative ions are educed.

During the phase of positive ion eduction, positive pulses are applied to the second gate electrode 2 and the ion source 0 so that the potentials generated along the axial direction of the ion gate fulfill the relationship: the potential at the ion source 0>the potential at the second gate electrode 2>the potential at the fourth gate electrode 4>the potential at the sixth gate electrode 6, and accordingly positive ions are educed.

In this case, efficiency of ion releasing is significantly high.

Fourth Embodiment

Figure 7:
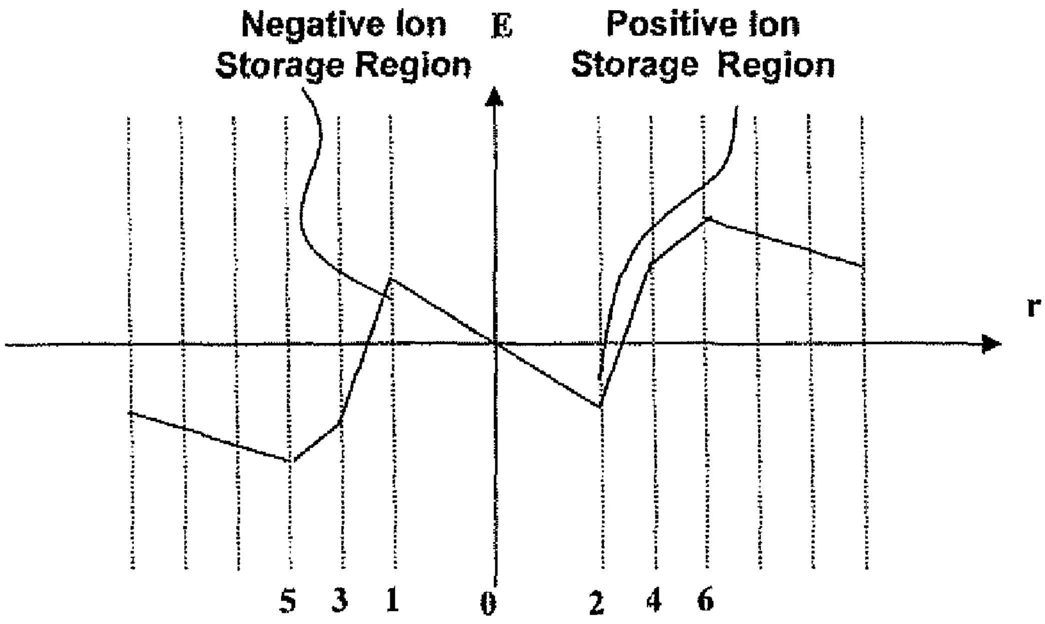
FIG. 7 is a schematic graph of the distribution of potentials along the tube axis during the ion storage and eduction according to the fourth embodiment of the present invention.

FIG. 7 is a schematic graph of the distribution of potentials along the tube axis during the ion storage and eduction according to the fourth embodiment of the present invention.

As shown in FIG. 7, the respective electrodes and the ion source are applied with voltages during the ion storage phase so that the potentials along the tube axis of the ion gate fulfill the relationship: the potential at the first gate electrode 1>the potential at the ion source 0>the potential at the third gate electrode 3>the potential at the fifth gate electrode 5, and accordingly a negative ion storage region for storing negative ions is formed adjacent to the first gate electrode 1; and the potential at the second gate electrode 2<the potential at the ion source 0<the potential at the fourth gate electrode 4<the potential at the sixth gate electrode 6, and accordingly a positive ion storage region for storing positive ions is formed adjacent to the second gate electrode 2.

During the phase of negative ion eduction, the negative ions are educed by controlling only the potential at the ion source 0, requiring a negative pulse having a jump amplitude large enough to enable the ions to penetrate through the first gate electrode 1, and causing the potential at the position on the tube axis corresponding to the first gate electrode 1 to be lower than the potentials at the positions on the tube axis corresponding to the third and fifth gate electrodes 3 and 5.

During the phase of positive ion eduction, the positive ions are educed by controlling only the potential at the ion source 0, requiring a positive pulse having a jump amplitude large enough to enable the ions to penetrate through the second gate electrode 2, and causing the potential at the position on the tube axis corresponding to the second gate electrode 2 to be higher than the potentials at the positions on the tube axis corresponding to the fourth and sixth gate electrodes 4 and 6.

In this case, the structure of control circuit and the control process are simple, and efficiency of ion releasing is relatively high.

Alternatively, the ions can be educed by applying pulses to the first gate electrode 1, the ion source 0 and the second gate electrode 2 at the same time.

During the phase of negative ion eduction, by applying negative pulses to the first gate electrode 1 and the ion source 0, and penetrating the potential at the third gate electrode 3, which potential has a value equal to the potential at the fifth gate electrode 5, the potentials generated along the axial direction of the ion gate are enabled to fulfill the relationship: the potential at the fifth gate electrode 5=the potential at the third gate electrode 3>the potential at the first gate electrode 1>the potential at the ion source 0, and accordingly negative ions are educed.

During the phase of positive ion eduction, by applying positive pulses to the second gate electrode 2 and the ion source 0, and penetrating the potential at the fourth gate electrode 4, which potential has a value equal to the potential at the sixth gate electrode 6, the potentials generated along the axial direction of the ion gate are enabled to fulfill the relationship: the potential at the ion source 0>the potential at the second gate electrode 2>the potential at the fourth gate electrode 4=the potential at the sixth gate electrode 6, and accordingly negative ions are educed.

In this case, efficiency of ion releasing is significantly high.

According to the embodiments of the present invention as described above, after sample gas enters the ion gates, charge exchange with reaction ions occurs between the first gate electrode and the second electrode, and positive and negative ions (sample ions, reaction ions) are continuously stored into the storage regions for the positive and negative ions.

Then, during the ion eduction, the ions are educed in a step-wise manner from the storage regions for the positive and negative ions by a simple control of the combined electrode.

The foregoing description is only intended to illustrate the embodiments of the present invention other than limiting the present invention. For those skilled in the art, any change or substitution that can be made readily within the scope of the present invention should be encompassed by the scope of the present invention. Therefore, the scope of the present invention should be defined by the claims.

What is claimed is:

1. An ion gate for a dual ion mobility spectrometer (IMS), the ion gate comprises:

an ion source, a first gate electrode placed on one side of the ion source, a second gate electrode placed on the other side of the ion source, a third gate electrode placed on the side of the first gate electrode away from the ion source, a fourth gate electrode placed on the side of the second gate electrode away from the ion source, wherein, during the phase of ion storage, the potential at the position on the tube axis of the ion gate corresponding to the first gate electrode is different from the potentials at the positions on the tube axis corresponding to the ion source and the third gate electrode, and the potential at the position on the tube axis corresponding to the second gate electrode is different from the potentials at the positions on the tube axis corresponding to the ion source and the fourth gate electrode.

2. The ion gate of claim 1, wherein during the phase of ion storage, the potential at the position on the tube axis corresponding to the first gate electrode is higher than the potentials at the positions on the tube axis corresponding to the ion source and the third gate electrode, and the potential at the position on the tube axis corresponding to the second gate electrode is lower than the potentials at the positions on the tube axis corresponding to the ion source and the fourth gate electrode.

3. The ion gate of claim 2, wherein the first, third and fifth gate electrodes are arranged, with respective to the ion source, in symmetry with the second, fourth and sixth gate electrodes.

4. The ion gate of claim 1, further comprising:

a fifth gate electrode placed on the side of the third gate electrode away from the ion source, and a sixth gate electrode placed on the side of the fourth gate electrode away from the ion source.

5. The ion gate of claim 4, wherein the fifth gate electrode and the sixth gate electrode act as the initial parts of drift tubes for positive and negative ions, respectively.

6. The ion gate of claim 4, wherein the first, third and fifth gate electrodes are arranged, with respective to the ion source, in dissymmetry with the second, fourth and sixth gate electrodes.

7. The ion gate of claim 1, wherein during the phase of ion eduction, ions are educed by controlling the potential on the tube axis of at least one of the ion source, the first, second, third and fourth gate electrodes.

8. A method for an ion gate for a dual ion mobility spectrometer (IMS), the ion gate comprises an ion source, and the method comprises steps of:

setting the potential at a first position on the tube axis on one side of the ion source to be different from the potential of the ion source and the potential at a third position on the tube axis of the ion gate, which is adjacent to the first position in the direction away from the ion source, on the same side of the ion source, so as to form a first ion storage region; and setting the potential at a second position on the tube axis on the other side of the ion source to be different from the potential of the ion source and the potential at a fourth position on the tube axis, which is adjacent to the first position in the direction away from the ion source, on the same other side of the ion source, so as to form a second ion storage region.

9. The method of claim 8, wherein the potential at a first position on the tube axis on one side of the ion source is set to be higher than the potential of the ion source and the potential at a third position on the tube axis, which is adjacent to the first position in the direction away from the ion source, on the same side of the ion source, so as to form a first ion storage region, and the potential at a second position on the tube axis on the other side of the ion source is set to be lower than the potential of the ion source and the potential at a fourth position on the tube axis, which is adjacent to the first position in the direction away from the ion source, on the same other side of the ion source, so as to form a second ion storage region.

10. The method of claim 9, further comprising a step of educing ions by controlling the potential on the tube axis.

11. The method of claim 10, wherein the step of educing ions by controlling the potential on the tube axis comprises applying a respective potential to one of the first, second, third and fourth positions to educe the ions.

* * * * *